US 6,560,127 B2

(12) United States Patent
Wittenbreder, Jr.

(10) Patent No.: US 6,560,127 B2
(45) Date of Patent: May 6, 2003

(54) POWER CONVERSION CIRCUIT HAVING IMPROVED ZERO VOLTAGE SWITCHING

(75) Inventor: Ernest H. Wittenbreder, Jr., Flagstaff, AZ (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/849,178

(22) Filed: May 4, 2001

(65) Prior Publication Data

US 2001/0036088 A1 Nov. 1, 2001

Related U.S. Application Data

(60) Provisional application No. 60/201,821, filed on May 4, 2000.

(51) Int. Cl.$^7$ .............................................. H02M 3/335
(52) U.S. Cl. ............................................ 363/17; 363/98
(58) Field of Search ....................... 363/17, 98

(56) References Cited

U.S. PATENT DOCUMENTS

| 4,758,941 A | * | 7/1988 | Felton et al. ................... 363/17 |
| 4,953,068 A | * | 8/1990 | Henze ............................. 363/98 |
| 5,157,593 A | * | 10/1992 | Jain ................................ 363/17 |
| 5,231,563 A | * | 7/1993 | Jitaru ............................. 363/98 |
| 5,414,609 A | * | 5/1995 | Levran et al. .................. 363/17 |
| 5,430,632 A | * | 7/1995 | Meszlenyi ..................... 363/98 |
| 5,442,540 A | * | 8/1995 | Hua et al. ...................... 363/98 |
| 5,444,608 A | * | 8/1995 | Jain et al. ...................... 363/17 |
| 5,541,827 A | * | 7/1996 | Allfather ....................... 363/17 |
| 5,625,539 A | * | 4/1997 | Nakata et al. ................. 363/98 |
| 5,926,381 A | * | 7/1999 | Moriguchi et al. ............ 363/17 |
| 5,930,122 A | * | 7/1999 | Moriguchi et al. ............ 363/98 |
| 6,147,886 A | * | 11/2000 | Wittenbreder ................. 363/17 |
| 6,310,785 B1 | * | 10/2001 | Ayyanar et al. ................ 363/17 |

\* cited by examiner

Primary Examiner—Jeffrey Sterrett
(74) Attorney, Agent, or Firm—April M. Mosby; Wade James Brady, III; Frederick J. Telecky, Jr.

(57) ABSTRACT

A highly efficient and simple power conversion circuit (300) having zero voltage switching (ZVS) includes a novel switch timing technique, such that the need for an leakage inductor connected in series with the primary circuit of the converter and rectifier diodes is eliminated. A switch timing circuit (351) located in an output side circuit (350) enables the use of the natural stored magnetic energy in the output side circuit (350) to drive the critical switching transitions to accomplish soft switching for all of the switches (314–317) in a full bridge forward converter (300) for all transitions. This power conversion circuit (300) includes a full bridge circuit (310) having plurality of switching devices (314–317) that intermittently couple the primary winding (327) to the input of the power converter (300). A transformer (326) couples to receive power from the full bridge circuit (310) into its primary winding (327). The output side circuit (310) includes the switching circuit (351) coupled to provide stored magnetic energy to drive the switching transitions of the switching devices (314–317) in the full bridge circuit (310). The switching circuit (351) closes at a predetermined time delay after the switching transitions in the full bridge circuit (310) to accomplish zero voltage switching for the plurality of switches in the full bridge circuit (310). A converter controller provides control signals to the full bridge and the switching circuits (310, 351).

18 Claims, 4 Drawing Sheets

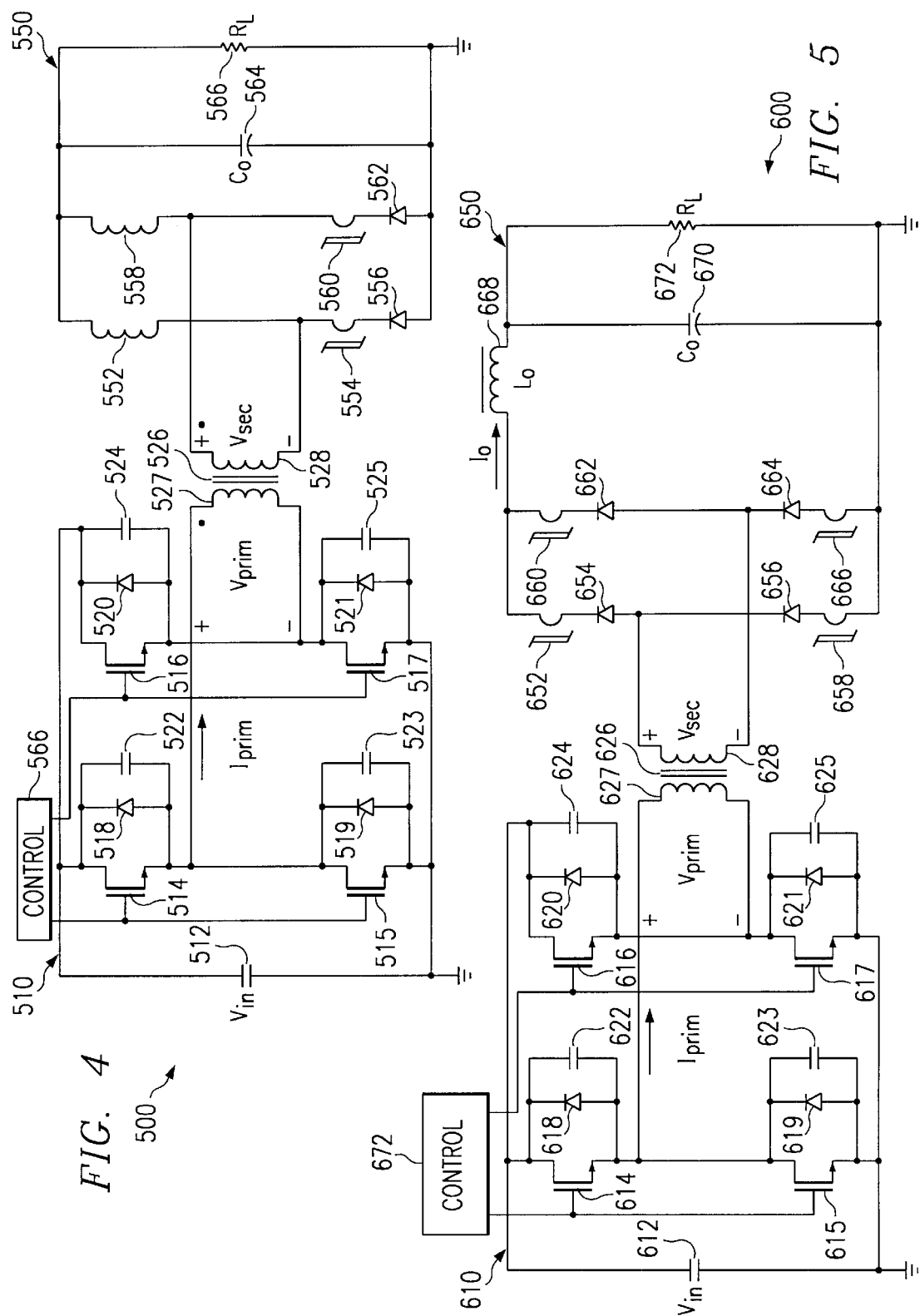

POWER CONVERSION CIRCUIT HAVING IMPROVED ZERO VOLTAGE SWITCHING

This application claims the benefit of Provisional application Ser. No. 60/201,821, filed May 4, 2000.

CROSS-REFERENCE TO RELATED APPLICATIONS

This application is related to the application Ser. No. 09/312,091, filed May 15, 1999, for "Dual Opposed Interleaved Coupled Inductor Soft Switching Converters," which is incorporated herein.

FIELD OF THE INVENTION

The present invention relates to power conversion circuitry and, more particularly, to an apparatus having an efficient power conversion to accomplish zero voltage switching using a novel switch timing technique.

BACKGROUND OF THE INVENTION

A known full bridge forward DC-to-DC converter having zero voltage switching typically includes a DC-to-AC converter circuit and an AC-to-DC converter circuit linked together by a high frequency AC link, where isolation is provided on the intermediate AC link. This type of converter is a common circuit topology used to transform electric energy from a source at a given potential to a destination load at a different potential. It typically includes four switches, typically power metal-oxide semiconductor field-effect transistors (MOSFETs), operated in alternating pairs, an input/output isolation and step-up/step-down transformer, an output rectifier, and an output filter. A feedback regulator or controller is included to control the switches.

The main advantages of this converter topology include: constant frequency operation, which allows optimum design of magnetic filter components, pulse width modulation (PWM) control, minimum voltage and current (VA) stresses, and good control range and controllability. Power converters are typically employed in applications that require conversion of an input DC voltage to various other DC voltages, higher or lower than the input DC voltage. Examples include telecommunications and computer systems wherein high voltages are converted down to lower voltages needed to operate the systems. Power converters generally suffer from problems such as switching losses, switching noise and common-mode power transformer noise. Switching losses reduce system efficiency, resulting in greater input power requirements for the same output power. Switching and transformer noise, both conducted and radiated, require filtering to prevent or reduce interference with other sensitive electronic equipment.

When switching devices turn on and off, there is a power loss associated with this action. The power loss relates to the current through the switch and the voltage across the switch during the switching transition. The greatest loss is associated with the turn on of the switch. Zero voltage switching, however, provides a means for eliminating switching losses particularly in higher line voltages. The resulting converter will be more efficient by dissipating less heat. Zero voltage switching is achieved by adding a controlled dead time at the turn on of each stage.

A full bridge converter of this type operates generally as follows. The switches are arranged in two diagonal pairs that are alternately turned on for a fraction of a switching period to apply opposite polarities of the input DC voltage across the primary of the transformer. The operation of the switches produce a zero voltage across the transformer by turning off only one switch of the pair. A switch from the alternate pair is then turned on, allowing the current in the primary circuit to circulate at zero voltage through the two switches. The two switches clamp the voltage across the transformer at zero, thereby eliminating the ringing behavior suffered by the conventional bridge when the switches are off. Thus the switches operate to convert the input DC voltage into an AC voltage required to properly operate the transformer.

Different schemes have been developed to reduce the additional switching losses caused by high frequency switching of conventional converters. For example, semiconductor switching losses can be reduced by using reactive snubber elements. In FIG. 1. a first snubber circuit is implemented in zero voltage switching converter 40. As illustrated, a snubber capacitor 64 may be connected in parallel with a converter semiconductor switch 56, having an anti-parallel connected diode 60. This snubber element 64 tends to limit the rate of rise of voltage experienced by the switching device 56. Thus, snubber element 64 provides an easy method to divert the energy that would be dissipated in the switching device 56 during switching. However, the energy stored in the snubber element 64 needs to be dissipated during a subsequent part of the switching cycle. Each converter semiconductor switch 57–59 are connected in parallel with a snubber capacitor 65–67 and in anti-parallel with a diode 61–63, respectively.

Converters that allow lossless resetting of the reactive snubber energy are referred to as "soft-switching" converters. Soft-switching converters may be broadly categorized as zero voltage switching. Various zero voltage switching schemes and converter topologies have been proposed in an attempt to achieve increased performance over conventional hard-switching converters. Many are disclosed in U.S. Pat. No. 5,781,419 which is incorporated herein.

An exemplary known soft-switching converter circuit topology is the full-bridge PWM converter shown at 40 in FIG. 1. This converter topology 40 achieves PWM control with resonant switching of the converter semiconductor switches. The basic DC-to-DC converter circuit topology 40 includes an input side circuit 42 and an output side circuit 44 with the input circuit 42 and output circuit 44 linked by a transformer 46. The transformer 46 includes a primary winding 48, a secondary winding 50, and is characterized by a leakage inductance 52. The primary 48 of the transformer 46 is connected to a DC input voltage source 54 by a bridge of converter switches that forms the input circuit 42. Four semi-conductor switching devices 56–59, e.g., transistors, form the input side circuit 42 converter bridge. Each switching device 56–59 includes an anti-parallel connected diode 60–63 and parallel connected capacitor 64–67. The output side circuit 44 connects the secondary winding 50 of the transformer 46 to a load, shown here as a resistance load 68, by a diode bridge including four diodes 70–73. An output side filter inductor 74 is connected in series between the diode bridge and the load 68. An output side capacitor 76 is connected in parallel with the load 68. In operation, a PWM controller is used to switch the input side circuit switching devices 56–59 in a sequence to generate an AC signal from the DC voltage source 54 across the primary winding 48 of the transformer 46. The resulting AC signal appearing on the secondary winding 50 of the transformer 46 is rectified by the diodes 70–73 of the output side circuit 44 to provide a DC output voltage to the load 68. The output side inductor 74 and capacitor 76 filter high frequency and transient voltages from the output voltage applied to the load 68. The magnitude of the DC output voltage applied to the load 68 is determined by the magnitude of the DC source voltage, the duty cycle of the PWM controller, and the turns ratio of the transformer 46.

In the DC-to-DC converter topology 40, the leakage 52 and magnetizing inductance's of the transformer 46 are effectively utilized to achieve zero voltage switching of the switching devices 56–59. The operation of the full-bridge PWM converter 40, to achieve zero voltage switching, is as follows. With input circuit switching devices 56 and 59 initially turned on and conducting, the voltage applied across the primary winding 48 of the transformer 46 will be the voltage level of the voltage source 54, $V_{in}$. A corresponding voltage will appear on the secondary winding 50 of the transformer 46, causing an output current to flow through diodes 70 and 73. When switching device 59 in the input side circuit 42 is turned off, the input voltage 54 is disconnected from the primary winding 48. With the input voltage Vin no longer applied to the primary winding 48 of the transformer 46, the current in the output side circuit 44 will free wheel through all of the output side diodes 70–73. A current thus continues to flow through the output side filter inductor 74 to provide power to the load 68. This stored energy in the output side circuit 44 is reflected back through the transformer 46 to the input side circuit 42. The continued flow of current through the primary winding 48 charges the output capacitance 67 of the input side switching device 59, and discharges the output capacitance 66 of input side switching device 58. This causes the anti-parallel connected diode 62 of switching device 58 to conduct. Thus, at this point, switching device 58 can be turned on under zero voltage switching conditions. Since the energy available for achieving zero voltage switching for the leading leg switching devices 58 and 59 is the energy stored in the output filter inductor 74, zero voltage switching can be achieved even at light loads.

After input side switching device 58 is turned on, input side switching device 56 may be turned off, at a later point in time. Current still flows through the primary winding 48 of the transformer 46 due to energy stored in the leakage inductance 52 of the transformer 46. When switching device 56 is turned off, this current charges the output capacitance 64 of switching device 56 and discharges the output capacitance 65 of switching device 57, causing the anti-parallel connected diode 61 of switching device 57 to conduct. Thus, switching device 57 may now be turned on under zero voltage switching conditions, to once again apply the input voltage $-V_{in}$ to the primary winding 48 of the transformer 46. The switching sequence is then repeated for the turn-off of input side switching devices 58 and 57, and the turn-on of input side switching devices 56 and 59. In order to ensure zero voltage turn-on of the switching devices 56 and 57 in the lagging leg of the input side circuit bridge 42, enough energy needs to be stored in the leakage inductance 52 of the transformer 46 to provide for charging and discharging of the switching device capacitors 64–67 throughout the switching sequence. Since the energy in the leakage inductance 52 is a function of the current to the load 68, zero voltage switching will be lost below a certain load level for the lagging leg switching devices 56 and 57. One way to extend the load range of the DC-to-DC converter 40 is thus by properly sizing the leakage inductance 52 of the transformer 46. In addition the effect of leakage inductance 52 on the circuit is to create a ringing condition with the parasitic capacitance associated with the secondary switches 70–73. The ringing is undamped and results in increased electromagnetic interference. Damping the ringing with a snubber circuit including rectifier diodes only results in additional energy losses.

Conventional soft switching full bridge converters do not enable the primary switch currents to decrease during the reset time of the output choke. In addition, these converters rely upon maintaining the stored energy in primary circuit magnetic elements for driving the switching transitions. The stored energy mechanisms used to drive the switching transitions are typically either relatively small chokes added specifically for the purpose or increased leakage inductance or reduced magnetizing inductance of the main transformer. In either case the amount of energy stored is small.

Thus, there is a need for a simple and efficient power conversion circuit having zero voltage switching.

SUMMARY OF THE INVENTION

To address the above-discussed deficiencies of the conventional full bridge converter having zero voltage switching, the present invention is directed to a highly efficient and simple power conversion circuit that accomplishes zero voltage switching (ZVS) using a novel switch timing technique. This circuit eliminates the need for an leakage inductor connected in series with the primary circuit of the converter and rectifier diodes, ultimately reducing size, weight and cost of the converter. A power conversion circuit having features of the present invention includes a full bridge circuit having a plurality of switching devices that intermittently couple the primary winding to the input of the power converter. A transformer couples to the full bridge circuit to receive power from the full bridge circuit into its primary winding. An output side circuit, connected to the secondary winding of the transformer, includes a switching circuit coupled to provide stored magnetic energy to drive the switching transitions of the switching devices in the full bridge circuit. The switching circuit closes at a predetermined time delay after the switching transitions in the full bridge circuit to accomplish zero voltage switching for the plurality of switches in the full bridge circuit. A converter controller provides control signals to the full bridge and the switching circuits.

This power conversion circuit provides a solution using a unique timing mechanism. The switch timing circuit enables the use of the natural stored magnetic energy in the output side circuit of the converter to drive the critical switching transitions to accomplish soft switching for all of the switches in a full bridge forward converter for all transitions.

The previously described version of the present invention has many advantages, including a simple and more reliable energy mechanism for driving the switching transitions and lower switch conduction losses by comparison to conventional full bridge forward converters. Since the energy storage elements used to store the energy to drive the transition are large in the present invention, the stored energy available to drive the transitions is larger than that known in the art. As a result of the large amount of stored energy available to drive the switching transitions, the range over which soft switching can be realized is larger. In addition, the circuit for driving the switching transitions does not require the reversal of the magnetizing current which leads to higher conduction and core losses in known converters. Moreover, the embodiments of the present invention reduce the conduction losses by comparison to other known soft switching full bridge forward converters, since the primary switch currents decrease with the output choke current during the reset time of the output choke. Furthermore, the stored energy used to drive the primary switching transitions is the energy stored in the large output choke(s), which is the natural stored magnetic energy component.

BRIEF DESCRIPTION OF THE DRAWINGS

For a more complete understanding of the present invention and the advantages thereof, reference is now made to the following description taken in conjunction with the accompanying drawings in which like reference numbers indicate like features and wherein:

FIG. 4 is a second embodiment of a power converter in accordance with the present invention;

FIG. 5 is a third embodiment of a power converter in accordance with the present invention.

DETAILED DESCRIPTION OF PREFERRED EMBODIMENTS

Figures 1, 2:
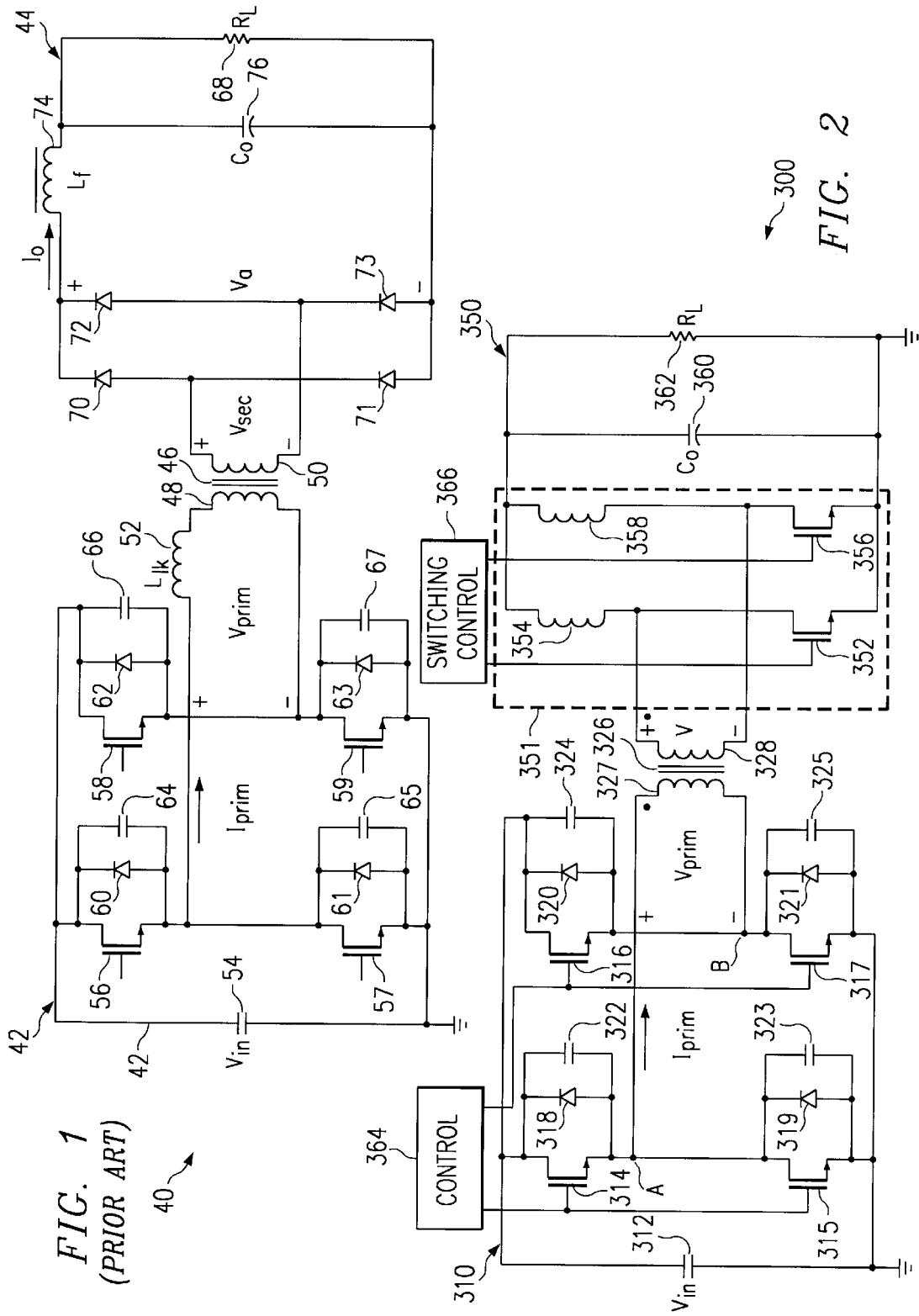
FIG. 1 is a known power conversion circuit.
FIG. 2 is a first embodiment of a power converter in accordance with the present invention.
Figure 3A:
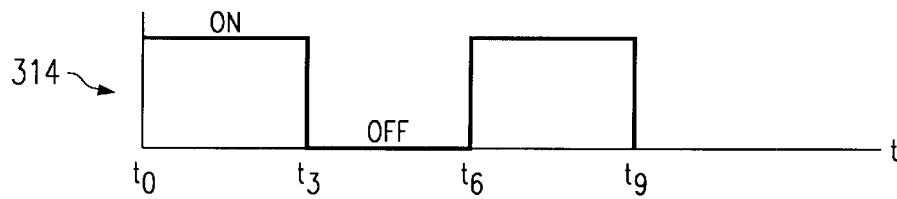
FIGS. 3a–f are timing diagrams demonstrating switch operation for each switching device of the power converter of FIG. 3 in accordance with the present invention.
Figure 3B:
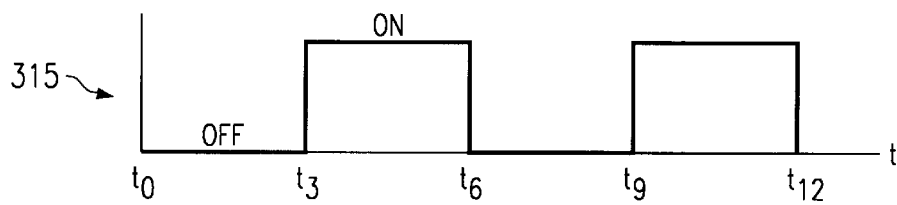
Figure 3C:
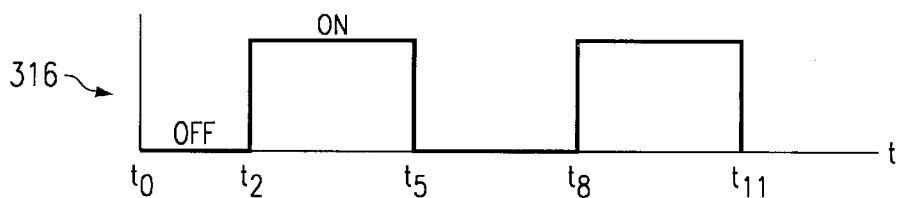
Figure 3D:
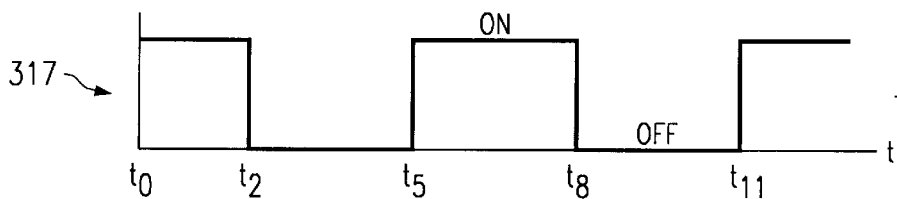
Figure 3E:
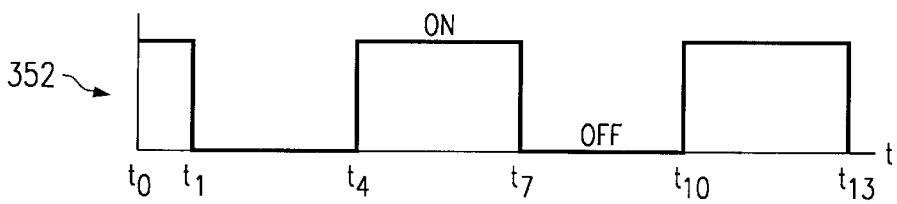
Figure 3F:
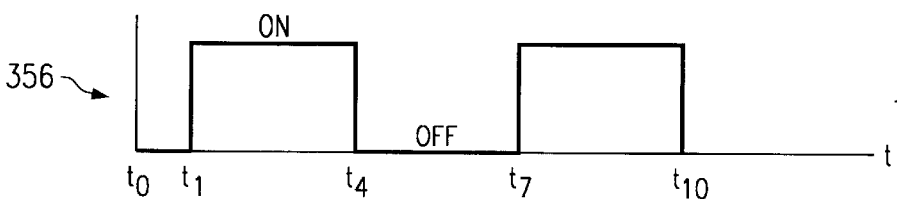

As shown in FIG. 2, the full bridge power converter 300 in accordance with the present invention eliminates the need for a leakage inductor 52, output side filter inductor 74, and rectifying diodes 70–73 as shown in FIG. 1. This converter circuit topology 300 includes an input side circuit 310 and an output side circuit 350 linked together by a transformer 326. The transformer 326 includes a primary winding 327 and a secondary winding 328. The primary 327 of the transformer 326 is connected to a DC input voltage source 312 by a bridge of converter switches 314–317 that forms the input circuit 310. Four semiconductor switching devices 314–317, e.g., transistors, form the input side circuit 310 converter bridge. This converter is particularly useful when the following types of devices are used for the switching devices 314–317: Insulated Gate Bipolar Transistors (IGBT), Bipolar Junction Transistors (BJT), Metal Oxide Semiconductor Controlled Thyristors (MCT), and Field Effect Transistors (FET). Each switching device 314–317 includes an anti-parallel connected diode 318–321 and parallel connected capacitor 322–325.

The output side circuit 350 connects the secondary winding 328 of the transformer 326 to a load, shown here as a resistance load 362, by two switch/inductor pairs 352, 354, 356, 358. The output side circuit 350 includes a switching circuit 351 coupled to provide stored magnetic energy to drive the switching transitions of the switching devices in the full bridge circuit, wherein the switching circuit closes at a predetermined time delay after the switching transitions in the full bridge circuit to accomplish zero voltage switching for the plurality of switches in the full bridge circuit. An output side capacitor 360 is connected in parallel with the load 362 to provide filtering of the voltage applied to load 362. In operation, a controller 364 is used to switch the input side circuit switching devices 314–317 in a sequence to generate an AC signal from the DC voltage source 312 across the primary winding 327 of the transformer 326. The controller is also used to switch the output side circuit switching devices 352 and 356. The resulting AC signal appearing on the secondary winding 328 of the transformer is driven by the energy stored in inductors 354 and 358 and by the timing of switches 352 and 356 of the output side circuit 350 to provide a DC output voltage to the load 362. The output side capacitor 360 filters high frequency and transient voltages from the output voltage applied to the load 362. The magnitude of the DC output voltage applied to the load 362 is determined by the magnitude of the DC source voltage, the duty cycle of the controller, and the turns ratio of the transformer 326.

In the DC-to-DC converter topology 300, the energy stored in inductors 354 and 358 effectively achieve zero voltage switching of the switching devices 314–317. The operation of the full-bridge converter 300, to achieve zero voltage switching, is as follows. With input circuit switching devices 314 and 317 initially turned on and conducting, the voltage applied across the primary winding 327 of the transformer 326 will be the voltage level of the voltage source 312, $V_{in}$. In order to achieve zero voltage switching, it is necessary to close switching device 356 at a predetermined time delay after the switching transition of one of the switching devices 314–317 in the input side circuit 310. In particular, when switching devices 315 and 317 are on the voltages applied to both the primary winding 327 and the secondary winding 328 are zero. While switches 315 and 317 are on switch 352 is on simultaneously. When switch 315 is turned off, switch 356 remains off while energy stored in inductor 358 drives the transition of the two primary switches 315 and 314, subsequent to which switch 314 is turned on at zero voltage. During this primary switching transition inductor 358 will force the voltage at the undotted terminal of secondary winding 328 to become negative with respect to the voltage at the dotted terminal of winding 328. After the completion of the transition in which switch 315 is turned off and switch 314 is turned on, switch 356 is turned on at a time determined by the predetermined time delay and switch 352 is turned off. Thus, while switches 314 and 317 are initially transitioning closed, switch 356 remains off and the energy stored in inductor 358 is available to drive the turn on transition of switches 314 and 317. During these transitions and the entire operating cycle, current continues to flow through both inductors 354 and 358 to output capacitor 360 and load 362.

The predetermined time delay may be on the order of one hundred nano-seconds for a midrange power converter of 100–500 W. It depends on parameters of the converter 300. If the converter 300 is a high power circuit on the order of 500 W or above, the time delay must be longer due to larger parasitic capacitors (not shown) in the windings of transformer 326 and switching devices 314–317, which translates into a more lengthy switching transition. If the converter 300 is a low power circuit on the order of 50–100 W, the time delay would need to be shorter due to a shorter switching transition.

The inductors 354 and 358, equal in size and inductance, share the average load current equally. During the first interval, current in inductor 354 increases, current in inductor 358 decreases and current in the primary winding 327 of transformer 326 increases. The energy in inductor 354 will drive the dotted side of the transformer 326 to decrease in voltage. Since the energy between the primary and secondary windings, 327 and 328, are coupled, the decrease in voltage at the dotted side of the secondary winding 328 will decrease the voltage at the dotted side of the primary winding 327. The current in the primary winding 327 of transformer 326 has two components, one component is a relatively small magnetizing current and the other component is equal to the current in the inductor 354 multiplied by the secondary to primary turns ratio of the power transformer 326. Thus, the current that is proportional to the current through inductor 354 dominates.

When switching device 317 in the input side circuit 310 is turned off, the input voltage 312 is disconnected from the primary winding 327. With the input voltage $V_{in}$ no longer applied to the primary winding 327 of the transformer 326, the current in the output side circuit 350 will free wheel through the switching device 356 and inductor 358. Current thus continues to flow through both inductors 354 and 358 to the output capacitor 360 and to the load 362. The current of inductor 354 is reflected back through the transformer 326 to the input-side circuit 310. The continued flow of current through the primary winding 327 charges the output capacitance 321 connected to switching device 317, and discharges the output capacitance 324 connected to switching device 316. This causes the anti-parallel connected diode 320 of switching device 316 to conduct. Thus, at this point, switching device 316 can be turned on under zero voltage switching conditions. Since the energy available for achieving zero voltage switching for the leading leg switching devices 316 and 317 is the energy stored in the inductor 354, zero voltage switching can be achieved even at light loads.

After switching device 316 is turned on, switching device 314 may be turned off, at a later point in time. Current still flows through the primary winding 327 of the transformer 326 due to energy stored in the inductor 354. When switching device 314 is turned off, this current charges the output capacitance 322 of switching device 314 and discharges the output capacitance 323 of switching device 315, causing the anti-parallel connected diode 319 of switching device 315 to conduct. Thus, switching device 315 may now be turned on under zero voltage switching conditions, to once again apply the input voltage $-V_{in}$ to the primary winding 327 of the transformer 326. Switching device 352 is closed after a predetermined time delay after the closing of switching device 315 closes. The switching sequence is then repeated for the turn-off of input side switching devices 316 and 315, and the turn-on of input side switching devices 314 and 317.

In order to ensure zero voltage turn-on of the switching devices 314 and 315 in the lagging leg of the input side circuit bridge 310, enough energy needs to be stored in the inductors 354 and 358 of the output circuit 350 to provide for charging and discharging of the switching device capacitors 322–325 throughout the switching sequence. Since the energy in the inductors 354 and 358 is a function of the current to the load 362, zero voltage switching will be lost below a certain load level for the lagging leg switching devices 314 and 315. One way to extend the load range of the DC-to-DC converter 300 is thus by properly sizing inductors 354 and 358.

FIG. 3 illustrates a graphical representation of a plurality of switching transitions as described for selected elements of the full bridge converter 300 shown in FIG. 2 in a conventional mode of operation. In particular, FIGS. 3a, 3b, 3c, 3d, 3e, and 3f represent control voltages applied to the switching elements 314, 315, 316, 317, 352, and 356, respectively. The switches 314–317 in the full bridge converter 300 are divided into two alternately conducting diagonal pairs. During a first interval (time $t_0$ to $t_2$), for a first duty cycle, the first and fourth switches, 314 and 317, conduct to apply an input voltage $V_{in}$ across the primary winding 327 of the transformer 326. Switch 356 conducts after a predetermined time delay (time $t_1$) to apply the voltage $V_{in}'$ transferred from the primary circuit 310 to inductor 354 and load 362. During a second interval (time $t_2$ to $t_3$), the first and third switches, 314 and 316, conduct. During this second interval the voltages applied to the transformer windings, 327 and 328, are zero and switch 356 continues to conduct. During a third interval (time $t_3$ to $t_5$), the third and second switches, 316 and 315, conduct to apply an input voltage $V_{in}$ across the primary winding 327 of the transformer 326. Switch 352 conducts at a delayed time (time $t_4$) to apply the voltage $V_{in}'$ transferred from the primary circuit 310 to inductor 358 and load 362. During a fourth interval (time $t_5$ to $t_6$), the second and fourth switches, 315 and 317, conduct. During this fourth interval, the voltages applied to the windings of the transformer 328 and 327, are zero and switch 352 continues to conduct. Accordingly, the current of inductor 358 is reflected back through transformer 326 to the input side circuit 310. A similar pattern of switching transitions exist during time $t_7$ through time $t_{13}$.

As shown in FIG. 4, another embodiment 500 in accordance with the present invention accomplishes secondary switching through the use of a series combination of rectifier diodes, 556 and 562, and saturable core inductors, 554 and 560. In the case of low output voltages used for digital logic, the saturable inductors need only be the size of a small bead with a single winding turn. The saturable inductors, 554 and 560, provide a brief delay in the switch "turn-on" timing of diodes, 556 and 562, due to the volt second product of the saturable inductor which must be overcome before it saturates. The size of the saturable inductor and the number of turns on the saturable inductor can be selected to provide an appropriate time delay. The circuit of FIG. 4 provides a converter 500 which achieves soft switching for every switch, 514–517, for every transition and eliminates first order switching losses. By comparison to other full bridge forward converters that offer soft switching this converter offers advantages in efficiency, cost, and complexity. The efficiency advantage is a result of decreasing circulating currents during the second and fourth switch states, 515 and 517, in which known converters maintain peak primary current flowing in the two active primary switches during these states. In contrast, the converter illustrated in FIG. 4 provides primary currents that ramp down quite rapidly. Another advantage of the present embodiment is that the transitions are driven from a large source of energy, namely, the energy stored in an output energy storage inductor, 552 and 558, whereas in conventional converters the magnetizing energy of a small inductor or the leakage or magnetizing inductance of the transformer are relied upon to provide energy to drive the switching transitions.

As shown in FIG. 5, another embodiment 600 in accordance with the present invention requires a single output choke 668, two additional secondary switches, 628 and 662, and two additional saturable core inductors, 652 and 660, in order to accomplish equivalent operation as that of converter 500 shown in FIG. 4.

Figure 6:
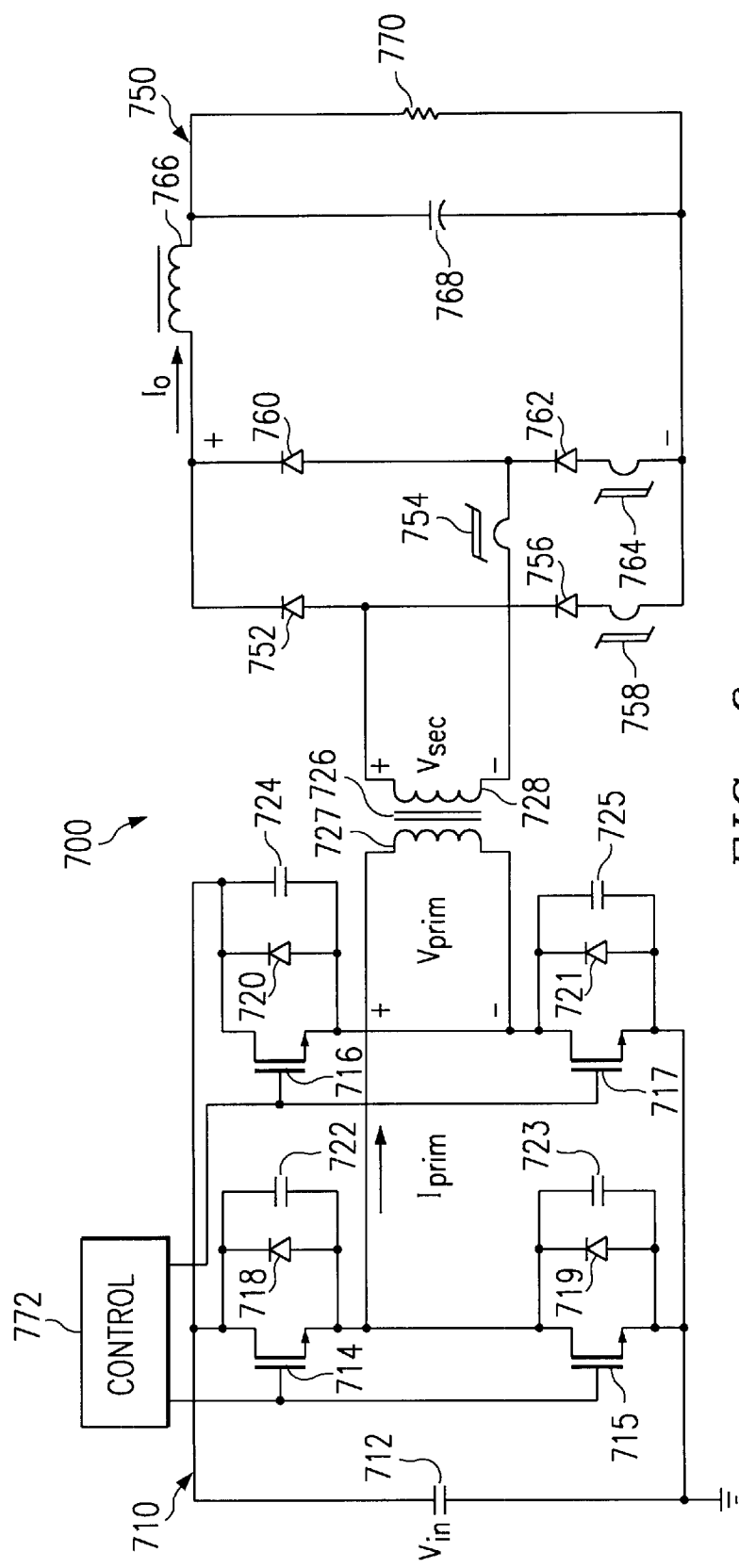
FIG. 6 is a fourth embodiment of a power converter in accordance with the present invention.

The necessary switch delay can also be provided by a single saturable reactor inductor 754 in series with the secondary winding 728, as shown in FIG. 6 with additional saturable inductors, 758 and 764, placed in series with the reset diodes, 756 and 762, respectively. In comparison to FIG. 5, this configuration eliminates the need for four saturable inductors. Yet, saturable inductor 754 swings from one saturation extreme to an opposite saturation extreme each cycle creating maximum core losses in the bead. Saturable inductors, 758 and 764, however, operate over a fraction of their magnetic induction/field (BH) loops such that core losses are not considerable.

The advantages of the present invention include and are not limited to a simple and more reliable energy mechanism for driving the switching transitions and lower switch conduction losses by comparison to conventional full bridge forward converters. Since the energy storage elements used to store the energy to drive the transition are large, the stored energy available to drive the transitions is larger than that known in the art. Thus, due to the increased stored energy available to drive the switching transitions, the range over which soft switching can be realized is larger. In addition, the switching circuit in accordance with the present invention for driving the switching transitions does not require the reversal of the magnetizing current which leads to higher conduction and core losses in known converters. Moreover, the embodiments of the present invention reduce the conduction losses by comparison to other known soft switching full bridge forward converters, since the primary switch currents decrease with the output choke current during the reset time of the output choke. Furthermore, the stored energy used to drive the primary switching transitions is the energy stored in the large output choke(s), which is a natural stored magnetic energy component.

The aforementioned embodiments in accordance with the present invention have been described using phase shift modulation of the primary switches, however, it is clear that similar benefits and operation are accomplished by using pulse width modulation. In some cases pulse width modulation will have advantages over phase shift modulation. These differences and advantages and disadvantages are well understood by those skilled in the art of power conversion. Moreover, although only one output is shown in the figures it is clear that this technique can be extended to converters with multiple outputs by providing additional secondary windings, rectifiers, saturable inductors, output capacitors and loads. Furthermore, the embodiments disclosed may include synchronous rectifiers coupled to appropriate gate drive control signals.

The reader's attention is directed to all papers and documents which are filed concurrently with this specification and which are open to public inspection with this specification, and the contents of all such papers and documents are incorporated herein by reference.

All the features disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. A power converter having an input and output, comprising:
    a full bridge circuit coupled to the input of the power converter;
    a converter controller coupled to the full bridge circuit, to provide control signals thereto;
    a transformer having a primary and secondary winding, the transformer coupled to the full bridge circuit to receive power from the full bridge circuit into a primary winding thereof;
    the full bridge circuit comprises a first plurality of switching devices that intermittently couple the primary winding to the input of the power converter; and
    an output side circuit connected to the secondary winding of the transformer and including a subcircuit coupled to provide stored magnetic energy to promote the switching transitions of the first plurality of switching devices in the full bridge circuit, wherein the subcircuit includes a second plurality of switching devices that controllably close at a predetermined time delay after the switching transitions in the full bridge circuit to accomplish zero voltage switching for the first plurality of switching devices in the full bridge circuit, wherein the second plurality of switching devices is a first and a second switching device, wherein the subcircuit includes a pair of parallel coupled branches, the first branch including the first switching device coupled in series with a first magnetic storage device, the second branch including the second switching device coupled in series with a second magnetic storage device.

2. A power converter as recited in claim 1, wherein the converter controller is a phase shift modulation controller.

3. A power converter as recited in claim 1, wherein the converter controller is a pulse width modulation controller.

4. A power converter as recited in claim 1, wherein the full bridge circuit comprises a third, a fourth, a fifth and a sixth switching device controlled by the controller in alternating pairs to deliver power received from the input of the power converter to the primary winding.

5. A converter as recited in claim 4, wherein the converter controller includes a switching device control means for turning on and off the third, fourth, fifth and sixth switching devices in a sequence to alternately connect the primary winding to the input of the power converter.

6. A power converter as recited in claim 1, wherein in the predetermined time delay is 100 nano-seconds.

7. A power converter as recited in claim 1, wherein the power converter further comprises an output filter interposed between the output side circuit and the output of the power converter.

8. A power converter as recited in claim 1, wherein the first magnetic storage device is an inductor and second magnetic storage device is an inductor.

9. A power converter as recited in claim 1, wherein the first and second switching device is selected from the group consisting of insulated gate bipolar transistors, bipolar junction transistors, metal oxide semiconductor controlled thyristors, and field effect transistors.

10. A power converter having an input and output, comprising:
    a full bridge circuit coupled to the input of the power converter;
    a converter controller coupled to the full bridge circuit, to provide control signals thereto;
    a transformer having a primary and secondary winding, the transformer coupled to the full bridge circuit to receive power from the full bridge circuit into a primary winding thereof;
    the full bridge circuit comprises a first plurality of switching devices that intermittently couple the primary winding to the input of the power converter;
    an output side circuit connected to the secondary winding of the transformer and including a subcircuit coupled to provide stored magnetic energy to promote the switching transitions of the first plurality of switching devices in the full bridge circuit to accomplish zero voltage switching for the first plurality of switches in the full bridge circuit, wherein the subcircuit includes a bridge having a first, second, third and fourth branch and an output choke coupled to the second and third branch, the output choke including an inductor;
    a first saturable core inductor coupled between the input of the subcircuit and the bridge; and wherein the first branch includes a serially coupled first rectifier diode and a second saturable core inductor, the fourth branch includes a serially coupled second rectifier diode and a third saturable core inductor and wherein the second and third branch each include at least one inductor.

11. A power converter having an input and output, comprising:

a full bridge circuit coupled to the input of the power converter;

a converter controller coupled to the full bridge circuit, to provide control signals thereto;

a transformer having a primary and secondary winding, the transformer coupled to the full bridge circuit to receive power from the full bridge circuit into a primary winding thereof;

the full bridge circuit comprises a first plurality of switching devices that intermittently couple the primary winding to the input of the power converter; and an output side circuit connected to the secondary winding of the transformer and including a subcircuit coupled to provide stored magnetic energy to promote the switching transitions of the the switching devices in the full bridge circuit, wherein the switching circuit closes at a predetermined time delay after the switching transitions in the full bridge circuit to accomplish zero voltage switching for the plurality of switches in the full bridge circuit, wherein the switching circuit includes a bridge having a first, second, third and fourth branch and an output choke coupled to the second and third branch, the output choke including an inductor.

12. A power converter as recited in claim 11, further comprising a saturable core inductor coupled between the input of the subcircuit and the bridge.

13. A power converter as recited in claim 11, further comprising a saturable core inductor coupled between the input of the subcircuit and the bridge.

14. A power converter having an input and output, comprising:

a full bridge circuit coupled to the input of the power converter;

a converter controller coupled to the full bridge circuit, to provide control signals thereto;

a transformer having a primary and secondary winding, the transformer coupled to the full bridge circuit to receive power from the full bridge circuit into a primary winding thereof;

the full bridge circuit comprises a first plurality of switching devices that intermittently couple the primary winding to the input of the power converter;

an output side circuit connected to the secondary winding of the transformer and including a subcircuit coupled to provide stored magnetic energy to promote the switching transitions of the first plurality of switching devices in the full bridge circuit to accomplish zero voltage switching for the first plurality of switches in the full bridge circuit, wherein the subcircuit includes a bridge having a first, second, third and fourth branch and an output choke coupled to the second and third branch, the output choke including an inductor;

a first saturable core inductor coupled between the input of the subcircuit and the bridge; and wherein the first branch includes a serially coupled first rectifier diode and a second saturable core inductor, the fourth branch includes a serially coupled second rectifier diode and a third saturable core inductor and wherein the second and third branch each include at least one diode.

15. For use in a power converter having a controlled full bridge circuit coupled to a transformer, the bridge having a plurality of switching devices delivering power received from an input of the power converter to a primary winding of the transformer, a method of providing stored energy from a controlled switching circuit coupled to the secondary winding of the transformer, wherein the switching circuit includes a pair of parallel coupled branches, each branch including a switching device coupled in series with a magnetic storage device, comprising the steps of:

controlling the full bridge circuit to intermittently couple the primary winding to the input of the power converter; and closing the switching circuit at a predetermined delay time after the closed switching transition of one of the plurality of switching devices.

16. A method as recited in claim 15, wherein the predetermined delay is 100 nano-seconds.

17. A method as recited in claim 15, wherein the controlling step includes a step of providing control signals from the controller to the controlled switching circuit and the switching devices in the full bridge circuit.

18. A method as recited in claim 15, wherein the controlling step includes a step of controlling the switching devices in alternating pairs to deliver power received from the input of the power converter to the primary winding.

* * * * *